United States Patent [19]

Allen

[11] 3,735,459
[45] May 29, 1973

[54] MULTIPLE AXIS WORK HEAD-WITH DUAL IN LINE WORK SPINDLES AS DISCLOSED

[76] Inventor: William T. Allen, P.O. Box 4151, Downey, Calif. 90221

[22] Filed: Aug. 28, 1970

[21] Appl. No.: 67,798

[52] U.S. Cl. .................29/26, 90/17, 408/35, 408/236
[51] Int. Cl. ........B23c 1/10, B23c 1/12, B23b 39/02
[58] Field of Search ...........................90/17; 29/26; 408/236, 35

[56] References Cited

UNITED STATES PATENTS

| | | | |
|---|---|---|---|
| 2,744,450 | 5/1956 | Walter | 90/17 X |
| 2,307,222 | 1/1943 | Johnson | 90/17 |
| 2,682,698 | 7/1954 | Berthiez | 408/35 X |

Primary Examiner—Francis S. Husar
Attorney—B. Edward Shlesinger, Jr., George A. Arkwright, George A. Garvey, Harold H. Dutton, Jr. and John F. Hoffman

[57] ABSTRACT

A single machine tool work head having dual spindles, in which one spindle is in a horizontal position and the second spindle is in line (i.e. at right angles thereto). The spindles are contained in a tool head which rotates to any of four or more positive positions, with automatic unlock, index and lock features. Five or more tool positions are shown along the X, Y and Z axes of the machine. The machine has a single drive to perform work on workpieces and to permit exposure of different planes for machine operations such as milling, drilling, boring, grinding or three-dimensional contouring. The work head is self-contained and does not require adaptors to achieve the five tool positions.

15 Claims, 10 Drawing Figures

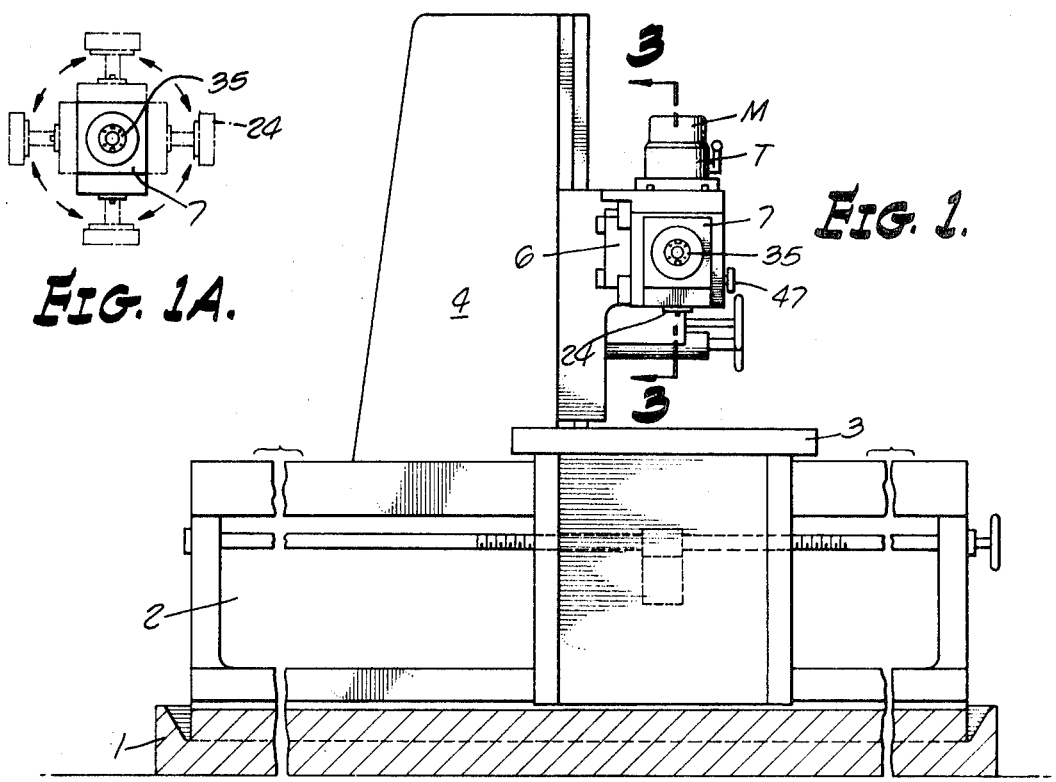
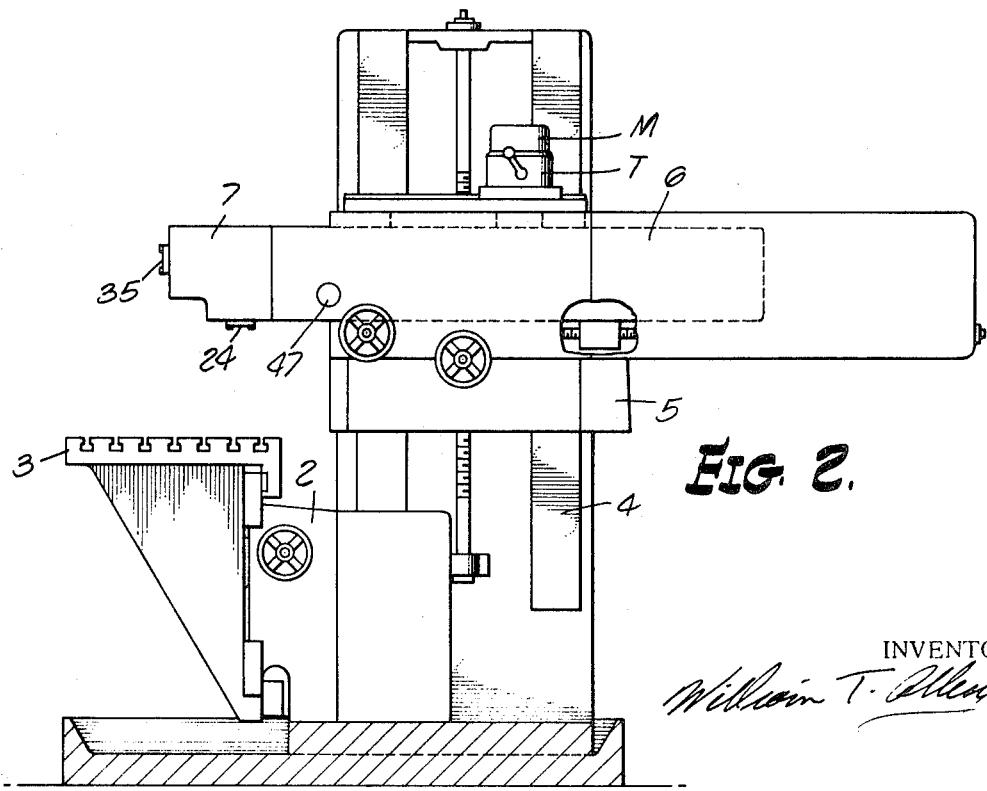

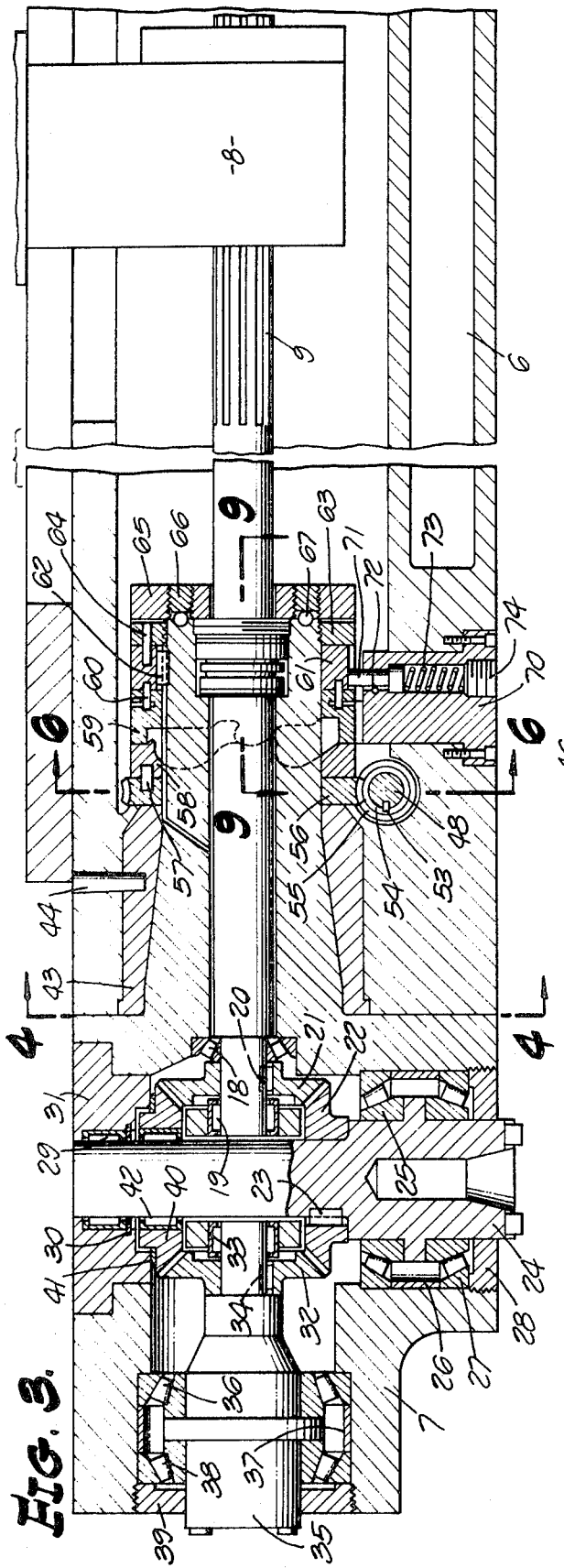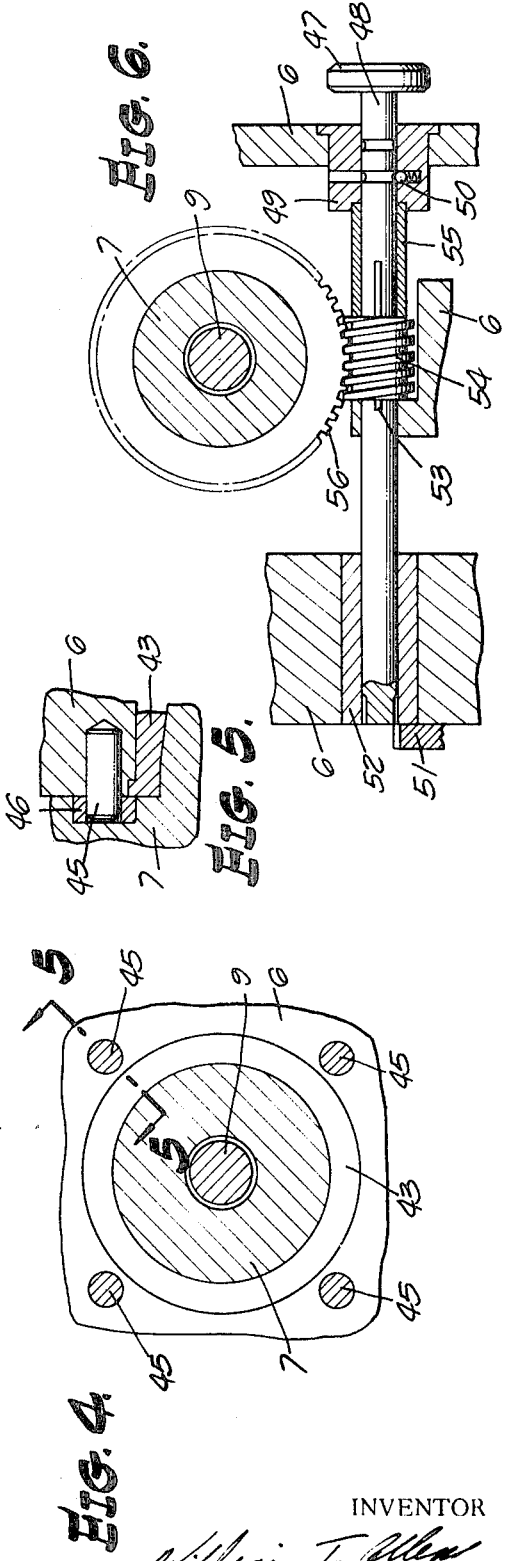

INVENTOR
William T. Allen

MULTIPLE AXIS WORK HEAD-WITH DUAL IN LINE WORK SPINDLES AS DISCLOSED

CROSS REFERENCE TO RELATED APPLICATIONS

Other applications such as planer mills using one or two of the multiple axis work heads would have a greater work range and versatility than with conventional equipment. A grinding machine would also benefit from this type of work head.

BACKGROUND OF THE INVENTION

This invention generally relates to improving machine tool applications by allowing a greater number of machineable planes on work pieces to be exposed in one set-up. This reduces handling time for the processing or machining of parts without the use of adapters, and allows an operator the capability of machining work pieces either in a vertical or horizontal plane on one machine with relative ease and accuracy. Furthermore the motor or transmission unit is relocated so that its position does not hamper the work head in various positions or obstruct the operator. This reduces the number of machines needed for vertical or horizontal milling, boring mill and jig bore operations and supplies the industry with a device that could be readily automated and up-graded to more elaborate equipment such as numerical control and three dimensional contouring.

FIELD OF THE INVENTION

This invention relates more to the metal working industry, particularly to cutting machineary such as milling and boring machines, used in the manufacture of machined parts, experimental assembles, prototypes, form dies, and fixtures. It may further be used for jig work for milling, drilling, and boring accurate holes in respective positions.

DESCRIPTION OF THE PRIOR ART

Many prior art devices have been thoroughly examined and not being anticipatory of the present invention as they work on multiple mechanisms whereas the present invention works on a single mechanism. The prior art requires trained operators to loosen bolts or nuts manually, to rotate the work head or adapters manually and to secure the same manually, resulting in possible lost time and scrap because of mis-alignment and movement of the work head while in operation. In the case of U.S. Pat. No. 3,037,430, (Deflandre, Milling and Boring Machine) wherein the work head has but two lock positions and the cutting tool must be removed and inserted in the opposite end of the work spindle, for reverse planes of work, and where the right angle spindle is not in line with either of the horizontal spindles a corrective move must be made to gain proper relationship. This is not true with the present invention since the work spindles are in line at any position and have at least four positive position locations, with no required adjustment ears, and does not have a second unit such as a locking key that must be slipped into position and lock manually. When using machinery common to most of the metal working trade, to machine a rectangular part on all sides and to drill and bore relatively accurate positioned holes on all sides, the most common practice requires an operator to align and fasten the part to be machined to the work table six times for milling and to repeat the process for drilling and boring using, in most cases, several machines for a completed part. This contributes to loss of work positions, production time, scrap and fatigue of the operator.

The prior art patents examined are:

REFERENCES CITED

UNITED STATES PATENTS

| | | | |
|---|---|---|---|
| 2,620,710 | 12/1952 | Gallimore | 90-20.5 |
| 2,307,222 | 1/1943 | Johnson | 90-17 |
| 3,232,171 | 2/1966 | Hengehold | 90-17 |
| 2,354,414 | 7/1944 | Walter | 29-26 |
| 1,242,775 | 10/1917 | Curtis | |
| 3,037,430 | 6/1962 | Deflandre | 90-17 |
| 3,292,235 | 12/1966 | Riedel | 29-26 |

OBJECTS AND SUMMARY OF THE INVENTION

The purpose of this invention is to provide an improved machine tool work head having selective work positions to achieve:
 a. Ease of indexing the work head position,
 b. Rapid selection of tool position,
 c. The capability of maintaining relative position when working from one plane to another,
 d. Five tool positions to be used in conjunction with the three machine axes,
 e. Automatic lock and unlock of the work head,
 f. The capability of doing more machine work in one set up,
 g. Vertical and horizontal machining capability in one set up,
 h. The capability of changing operation sequence while using only one machine,
 i. The capability of holding squareness of work without resetting work piece,
 j. The capability of machining needed parts with fewer machines per shop,
 k. The capability of changing head positions without realigning,
 l. Reduced handling time for machine parts,
 m. More direct machining time, as the accrued lost time is reduced compared to conventional methods of moving the work piece to expose different machining planes,
 n. Mirror image when contour milling mating parts.

Various applications may be made of this device other than illustrated and described. This invention relates more generally to Milling and Boring machines where the work head is part of a horizontal section and slidable in a saddle that is either sectional or whole and mounted to a vertical standard, such as shown, allowing bi-directional movements with machine axes. Even though four positions of the work head are explained in the description it should be pointed out that a greater number of increments are easily obtainable.

BRIEF DESCRIPTION OF THE DRAWINGS

FIG. 1 is a fragmentary partial sectional front view of a milling and boring machine incorporating the invention.

FIG. 1A is a fragmentary sectional front view of FIG. 1. showing four lock positions of the work head.

FIG. 2 is a partial sectional side elevation of FIG. 1.

FIG. 3 Fragmentary sectional view on an enlarged scale, taken on line 3—3 of FIG. 1. and viewed in the direction of the arrows.

FIG. 4 is a fragmentary sectional view on line 4—4 of fIG. 3. and viewed in the direction of the arrows FIG. 5 is a fragmentary enlarged sectional view on line 5—5 of FIG. 4. and viewed in the direction of the arrows.

FIG. 6 is a fragmentary sectional view on line 6—6 of FIG. 3. and viewed in the direction of the arrows

DESCRIPTION

Figure 7:
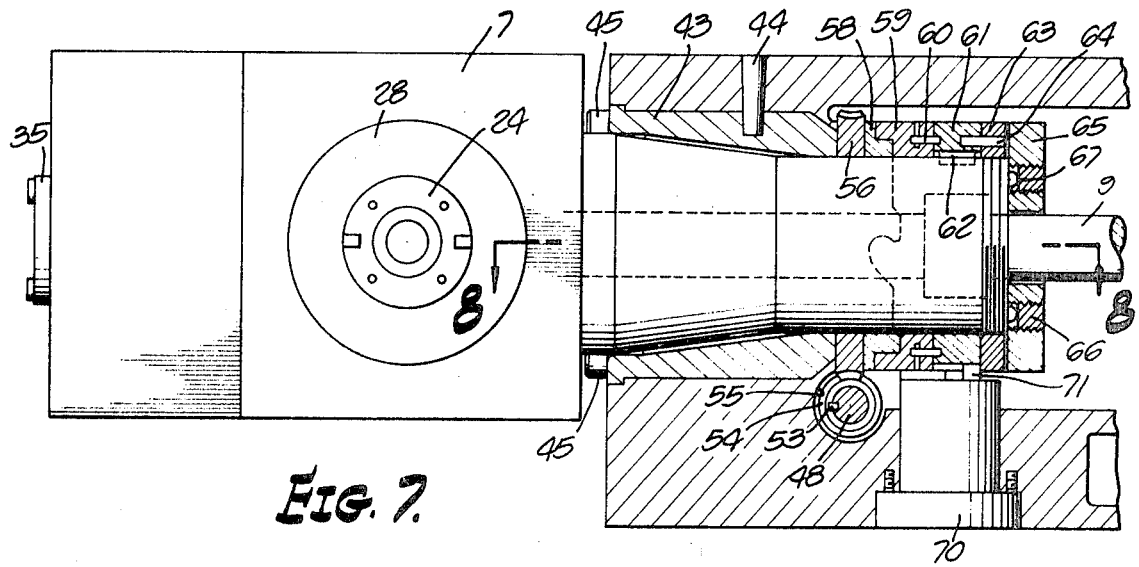
FIG. 7 is a fragmentary partially sectional longitudinal view taken on line 3—3 of FIG. 1 and viewed in the direction of the arrows, on en enlarged scale showing the unlock and re-set position of the index mechanism.

FIG. 1 and 2 show a multiple jig axis mill, similar to a boring mill and milling machine which may generally by of any conventional type, and which may for example, include as shown: machine base 1; machine gap and ways section 2; saddle and or work table 3 capable of lateral movement; vertical column and ways 4; ram saddle 5; ram and ways 6, which is slidable in the saddle section 5, to allow tool deployment horizontally across work table 3, and vertically with saddle 5, which moves on vertical ways 4, with the ram later being described as a non-rotatable section 6, having a section that accepts the work head 7, that has rotatable dual inline spindles 24 and 35. A right angle work spindle 24 and a horizontal work spindle 35, having a single drive shaft 9, that is concentric with the ram 6 and work head 7.

FIG. 1A shows four positions of the work head 7, with the dual in-line work spindles 24 and 35, and particularly positions of the right angle work spindle 24, where at least five tool positions become obvious, along the X, Y, Z, axes of the machine. The two spindles are made to accept standard quick change tool adapter, for holding cutting tools such as milling cutters, drills, reamers, boring tools, etc.

Describing the mechanics of the dual spindle work head, Motor M transmits power through transmission T. Since spindle 24 is required to traverse to the extreme edge of work table 3, both M and T have a sliding motion to compensate for additional travel needed to exploit the dual spindle feature. spindle 24 to traverse to the extreme edge of work table 3.

Transmission T transmits power through mittered gear box 8 (FIG. 3.) Affixed to the transmission base; a splined drive shaft 9 pass through mittered gear box 8, and is capable of rotating either clockwise or counter-clockwise. Drive shaft 9 extends from a slip fit inner race ball bearing (not shown) at the extreme end of ram 6 through mittered gear box 8 that transmits radial power to drive shaft 9 while at the same time permitting linear movement of both the drive shaft 9 and the mittered gear box 8. Drive shaft 9 in turn transmits power to the main drive gear 21.

Figure 9:
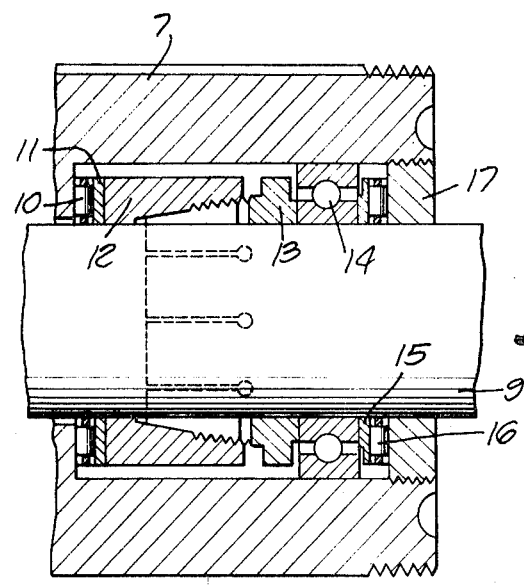
FIG. 9 is a fragmentary sectional view on an enlarged scale taken on line 9—9 of FIG. 3 and viewed in the direction of the arrows.

FIG. 9. shows the means for retaining drive shaft 9 in a fixed axial position relative to work head 7, but rotatable therein. A thrust roller bears 10 bearing against a shoulder in the conical extension section of work head 7 and a thrust washer 11 abuts the finished end of collet lock nut 12 that collapses and retains collet 13 in a locked position about the drive shaft 9 Ball bearing 14, which bears the radial load, is positioned by thrust washer 15, thrust roller bearing 16 and retainer cap 17.

Referring again to FIG. 3. a description of the gear work head and support mechanism follows. The drive shaft 9 is supported by taper roller bearing 18 and roller bearing 19 minus inner race in combination to carry both the radial and thrust loads of bevel drive gear 21, that is coupled to drive shaft 9 by means of key or splines 20. Gear 21 meshes with sun gear 22 that drives the right angle work spindle 24, which thru key 23. Work spindle 24 is supported at the work end by matched taper roller bearings 25 and 27, maintains a fixed position in relation with flange of work spindle 24 by spacer 26 and is locked in a desired operative position by bearing and spindle retainer cap 28. The end opposite the work end of spindle 24 is supported by roller bearing (no inner race) 29 that is retained in bearing and gear retaining plate 31 by bearing retaining spring 30 for ease of assembly and disassembly.

The horizontal work spindle 35 is driven by bevel sun gears 22 and 40 with the sun gear 40 being rotatable about the axis of spindle 24. Sun gears 22 and 40 in turn drive bevel gear 32 that in turn drives the horizontal work spindle 35 thru key 34. Work spindle 35 is supported by roller bearing 33 minus inner race and matched taper roller bearings 36 and 38. It is positioned by spacer 37 and the flange of spindle 35 in the same operative fashion as spindle 24, and locked in place by spindle and bearing retainer cap 39. Sun gear 40 is rotatable about the axis of spindle 24 by means of a roller bearing 42 and held in place by roller thrust bearing 41 which rotates against retainer cap 31. This completes the description of the gear portion of work head 7.

FIG. 4. shows the concentric alignment of drive shaft 9, work head 7, conical liner 43, ram 6 and the locating pins 45 equally spaced for positive index locked position. When work head 7 is engaged in locked position, bushings 46, located in work head 7, slip into place over locating pins 45, located in ram 6, and the conical section of work head 7 slips into liner bushing 43, located in ram 6.

Referring again to FIG. 3, the method for eliminating the necessity of indicating when the work head is in alignment and for assuring positive position upon selecting a new plane of work will be described. Work head 7, cam 58, cam activator 59 and conical sleeve 43 are shown in locked position.

The straight portion at the front end of the conical section of work head 7 and liner bushing 43 support the work head 7 when in a released or forward position to prevent damage to the drive shaft 9 bearings. The forward position of work head 7 permits rotation to a selected position of indexing.

Referring to FIG. 6, rack gear 51 can have several positions either as shown or upside down and fixed in position in the ram saddle 5, or slidable in its own channel in the back side of ram 6 and activated by a finger affixed to ram saddle 5. Pinion gear shaft 48 is rotated by rack gear 51 when in its forward or engaged position. This is accomplished by pushing in activating knob 47, which is attached to pinion shaft 48. Knob 47 is pulled out to bypass the index cycle. When activating knob 47 is pushed in, spring loaded ball 50, retained in bushing 49, maintains position for a complete cycle of index. As pinion shaft 48 becomes engaged with rack gear 51 and as the ram 6 travels to the rear, manually or by power feed, pinion shaft 48 rotates and transmits radial movement to worm 54 through key 53. This in turn rotates worm gear 56 about the axis of the work head straight section (adjacent to the conical section of work head 7) that serves as an axes for the locking and index mechanisms 55 is a work positioning spacer. As shown in FIG. 3, worm gear 56 is affixed to the rise and fall face cam 58 by dowell pin 57 so that both the worm gear 56 and face cam 58 must rotate in unison as the face cam 58 rotates counter-clockwise. Cam activator and lock 59 is fixed from rotating by spring loaded pawl finger 60 engaging face indents of ratchet washer 61 that is locked to work head 7 by key 62. Work head 7 is locked in place by bushing 46 in position over locating pins 45 (see FIG. 5). This allows face cam 58 to rotate to the low unlocked position so that the cam activator and lock 59 rests in this low position.

Figure 8:
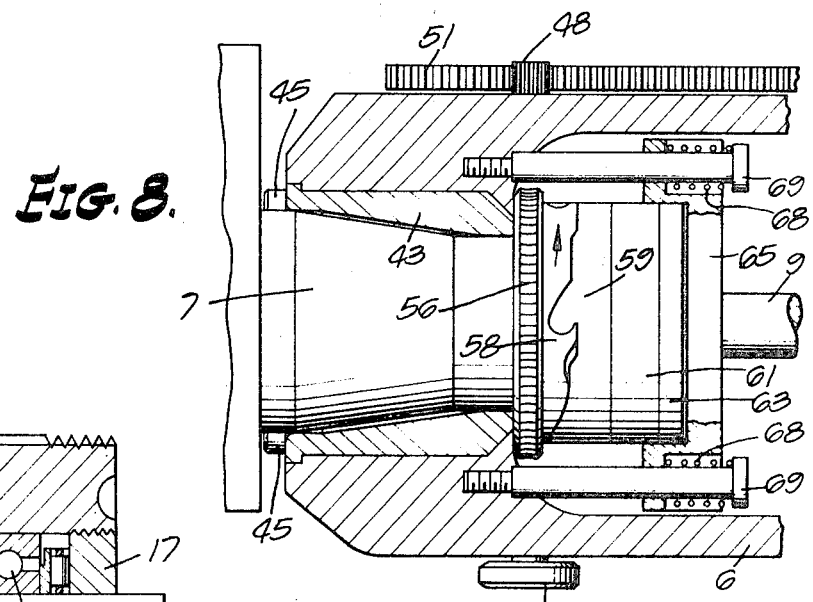
FIG. 8 and viewed in the direction of the arrows sectional view of line 8—8 of FIG. 7.

FIG. 7 shows the unlocked and re-set position of the face cam 58 and cam activator 59. This position allows index bushing 46 to slip free of locating pins 45 as pressure plate 65 (referring now to FIG. 8), motivated by compression spring 68 and restrained by shoulder screws 69 releases the conical work head section from the mating section of liner bushing 43. This is a simultaneous action, during unlocking and locking. As the ram 6 continues to travel backwards, the aforementioned rotation of the face cam 58 in turn now causes a release of ball bearing 67 and rotates ratchet washer 61 through the finger pawl 60 which is positioned by pin spring loaded in the cam activator 59 and thereby causing a rotation when engaging with the face recesses of the ratchet washer 61. Since washer 61 is keyed to work head 7, the latter rotates. The assembly of the worm gear 56, face cam 58, cam activator 59, ratchet washer 61, are held in position by lock nut 63 which in turn is prevented from loosening by lock screw 64. A desired index position can be obtained by the length of travel of ram 6 and the resulting movement of pinion gear 48 over the rack gear 51 (as shown in FIG. 8.). Once the desired position of index is obtained, the backward travel of the ram 6 will be stopped. At this point ball bearing 67 will fall into its respective indents at the extreme back end of the work head 7 and the index finger 71 falls into its respective ratchet notch along the outer circumference of the ratchet washer 61. thus preventing any return rotation in the opposite or clockwise motion. Finger 60 pawls will release from the index washer 61 and returns in a clockwise motion with the cam 58 until such time as the stop finger on the outside of cam activator 59 makes contact with the stop finger on the index finger housing 70. At this point no further rotation of the cam activator 59 can take place. The continued forward movement of the pinion shaft 48 over the rack gear 51 then forces further radial movement of the face cam 58 which in turn causes the cam activator 59 to pull the work head 7 backwardly until bushings 46 return to their locked position over locating pins 45 and the conical section of the work head 7 returns to its locked position with the liner bushing 43 conical section. At the same time the pinion shaft gear 48 becomes free of the rack gear 51 and the work head 7, which has assumed the preferred index position, is locked automatically.

Referring once again to FIG. 3, 44 is a ram sleeve insert locking pin 66 is a ball bearing retainer set screw, 72 is an index finger positioning pin, 73 is an, index finger spring and 74 is an, index finger spring assembly. The mating faces of face cam 58, both faces of cam activator 61, and the indent face side of ratchet washer 59 may be texturized with dry lubricant for ease of operation. cam activator 61, and the indent face side of ratchet washer 59.

I claim:

1. In a machine tool of the class having a saddle capable of vertical movement and a ram linearly slideable in the saddle in a horizontal direction, the combination of a work head rotatably connected to said ram; a first work spindle rotatably connected to said work head and coaxial therewith; a second work spindle rotatably connected to said work head and in line with said first work spindle; drive means for rotating said spindles, said drive means being coaxial with said first spindle and in line with said second spindle; and index means for unlocking said work head from said ram, rotating said work head about said ram and locking said work head to said ram, said index means including movable means having a first motion transmitting surface, movable means having second motion transmitting surface cooperating with said first surface, and means associated with said ram for transmitting linear motion from said ram to said first mentioned movable means.

2. The apparatus of claim 1 and wherein said work spindles are capable of accepting standard tool holders.

3. The apparatus of claim 1 and wherein said second work spindle has selective multiple positions at right angles to said first work spindle.

4. The apparatus of claim 1 and wherein said second work spindle has four selective right angle positions relative to said first work spindle thereby permitting five tool positions requiring only one tool change.

5. The apparatus of claim 1 and wherein said index means includes: cooperating locating pins and recesses associated with said ram and said work head to lock said work head in a selected index position.

6. The apparatus of claim 1 and wherein said drive means includes a drive shaft disposed within said work head said drive shaft being capable of reciprocating in unison with said work head and rotating within said work head.

7. The apparatus of claim 1 and including means for transmitting power through said drive means to rotate said spindles while reciprocating in unison with said ram.

8. The apparatus of claim 1 and including power means for supplying power to said drive means said power means being removed from said spindles.

9. In a machine tool class having a saddle capable of vertical movement and a ram linearly slideable in the saddle in the horizontal direction, the combination of a work head rotatably connected to said ram; a first work spindle rotatably connected to said work head and coaxial therewith; a second work spindle rotatably connected to said work head and in line with said first work spindle; drive means for rotating said spindles, said drive means being coaxial with said first spindle and in line with said second spindle; said drive means including a rotatable drive shaft, a drive gear keyed to said drive shaft, a first spindle gear coaxial with and keyed to said first spindle, first and second sun gears coaxial with said second spindle and in intermeshing engagement with said drive gear and said first spindle gear, one of said sun gears being keyed to said second spindle and the other of said sun gears freely rotatable on said second spindle; and index means for unlocking said work head from said ram, rotating said work head about said ram and locking said work head to said ram.

10. In a machine tool of the class having a saddle capable of vertical movement and a ram linearly slideable in the saddle in a horizontal direction, the combination of a work head rotatably connected to said ram; a first work spindle rotatably connected to said work head and coaxial therewith; a second work spindle rotatably connected to said work head and in line with said first work spindle; drive means for rotating said spindles, said drive means being coaxial with said first spindle and in line with said second spindle; an index means for unlocking said work head from said ram, rotating said work head about said ram and locking said work head to said ram, said index means including a rack gear affixed to said ram saddle, pinion gear means selectively rotated by said rack gear when said ram undergoes backward linear motion and a rise and fall face cam affixed to said pinion gear means and rotating in unison with said pinion gear means thereby effecting unlocking of said work head from said ram.

11. In a machine tool of the class having a saddle capable of vertical movement and a ram linearly slideable in the saddle in a horizontal direction, the combination of a work head rotatably connected to said ram; a first work spindle rotatably connected to said work head and coaxial therewith; a second work spindle rotatably connected to said work head and in line with said first work spindle; drive means for rotating said spindles, said drive means being coaxial with said first spindle and in line with said second spindle; and index means for unlocking said work head from said ram, rotating said work head about said ram and locking said work head to said ram, said index means including a rise and fall face cam selectively rotated when said ram undergoes backward linear motion, a cam activator cooperating with said face cam to rotate in unison with said face cam when said work head is unlocked from said ram, a ratchet washer keyed to said work head and having face indents and finger pawls on said cam activator cooperating with said face indents to rotate said ratchet washer and said work head.

12. In a machine tool of the class having a saddle capable of vertical movement and a ram linearly slideable in the saddle in a horizontal direction, the combination of a work head rotatably connected to said ram; a first work spindle rotatably connected to said work head and coaxial therewith; a second work spindle rotatably connected to said work head and in line with said first work spindle; drive means for rotating said spindles, said drive means being coaxial with said first spindle and in line with said second spindle; and index means for unlocking said work head from said ram, rotating said work head about said ram and locking said work head to said ram, said index means including a rise and fall face cam selectively rotated when said ram undergoes forward linear motion, a cam activator cooperating with said face cam to rotate in unison with said face cam and stop means associated with said cam activator whereby said cam activator will be prevented from further rotation and said face cam will effect locking of said work head to said ram.

13. In a machine tool of the class having a saddle capable of vertical movement and a ram linearly slideable in the saddle in a horizontal direction, the combination of a work head rotatably connected to said ram; a first work spindle rotatably connected to said work head and coaxial therewith; a second work spindle rotatably connected to said work head and in line with said first work spindle; drive means for rotating said spindles, said drive means being coaxial with said first spindle and in line with said second spindle; an index means for unlocking said work head from said ram, rotating said work head about said ram and locking said work head to said ram, said index means including spring means for urging said work head out of locking relationship with said ram.

14. The apparatus of claim 1 and including means for selectively activating said index means.

15. In a machine tool of the class having a saddle capable of vertical movement and a ram linearly slideable in the saddle in a horizontal direction, the combination of a work head rotatably connected to said ram; a first work spindle rotatably connected to said work head and coaxial therewith; a second work spindle rotatably connected to said work head and in line with said first work spindle; drive means for rotating said spindles, said drive means including a rotatable drive shaft and gear means for transmitting rotary motion from said drive shaft to said work spindles, said drive shaft being coaxial with said first spindle and in line with said second spindle, said second spindle intersecting the axis of said drive shaft and said first spindle; and index means for unlocking said work head from said ram, rotating said work head about said ram and locking said work head to said ram.

* * * * *